Aug. 11, 1970  P. E. HIXON ET AL  3,523,729
APPARATUS FOR VIEWING AND REPRODUCING FILM MEDIUM
CONTAINING TWO OR MORE RELATED IMAGES
Filed May 20, 1968  2 Sheets-Sheet 1

INVENTORS
PHILIP E. HIXON
MARVIN B. FLEISHER
BY
John M. Brandt
ATTORNEY

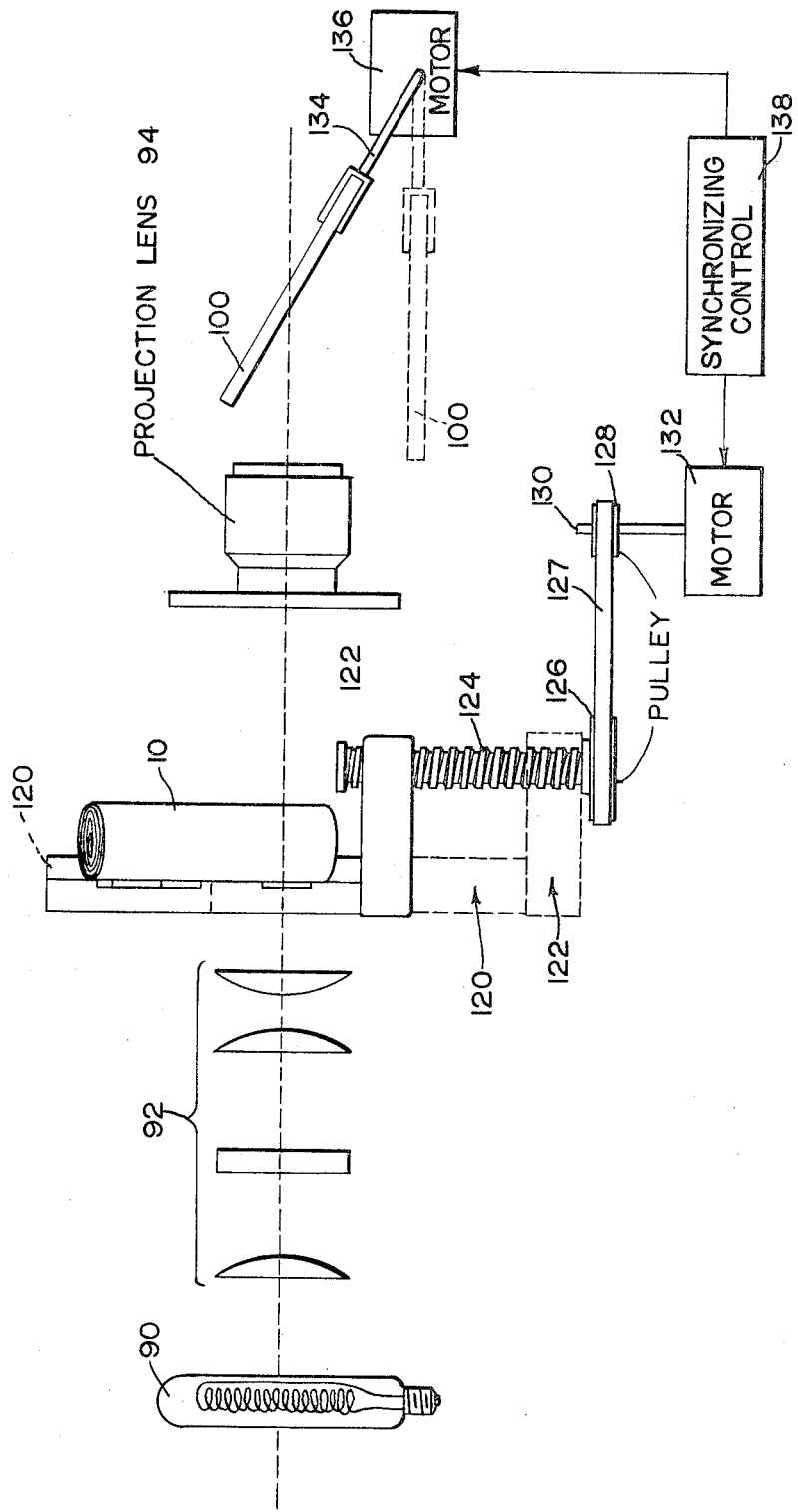

United States Patent Office 3,523,729
Patented Aug. 11, 1970

3,523,729
APPARATUS FOR VIEWING AND REPRODUCING FILM MEDIUM CONTAINING TWO OR MORE RELATED IMAGES
Philip E. Hixon, Huntington, and Marvin B. Fleisher, Jericho, N.Y., assignors to Itek Corporation, Lexington, Mass., a corporation of Delaware
Filed May 20, 1968, Ser. No. 730,464
Int. Cl. G03b 27/32, 21/26
U.S. Cl. 355—46          5 Claims

ABSTRACT OF THE DISCLOSURE

A combined viewing and reproducing apparatus using film with two different photographic images. One is positive and is used for viewing. The reproducing image is a negative. The apparatus can selectively reproduce the negative image while the positive image is continuously projected for viewing.

BACKGROUND OF THE INVENTION

Field of the invention

This invention relates to multipurpose film transparencies and associated apparatus which may be used for projecting an image for viewing and for optionally reproducing a copy of all or a portion of the same image for in-hand use. The concept of the invention is particularly applicable in an educational or demonstration context where it is desired to view a positive of a scene in color or black and white and reproduce on command one or more copies of the scene from a negative for use by the viewer.

Description of the prior art

The prior art discloses a variety of machines known as reader-printers which heretofore have been used for viewing images stored upon transparencies and selectively printing from the same transparency images used for viewing. An example of such apparatus is contained in U.S. Pat. No. 3,240,115, issued to D. H. Robbins et al., which is incorporated by reference herein. That apparatus employs an optical system which may be used to view a microfilm image or the like and, when desired, reproduce the same as reversed hard copy.

Stereo viewers employ film strips or wheels containing sets of similar but unidentical images of the same scene, usually in color. These are not usually adapted for printing, however, and are primarily hand-held systems for individual, rather than group, applications.

SUMMARY OF THE INVENTION

An embodiment of the invention as described below employs a film transparency having one or more sets of photographic images. The configuration of at least a part of each image in each set is identical with a part of the configuration of another image in the same set, while the photographic composition is different. One image is adapted for viewing in a device such as the reader-printer referred to above, and another image is adapted for reproduction on a photosensitive material in the same device.

Details of the invention will be better understood by reference to specific embodiments thereof that are illustrated in the drawings that form a part of this application.

DESCRIPTION OF THE DRAWINGS

FIG. 3 is a side view of an improved mechanism for orienting each image of a set in the embodiment of FIG. 1 in a reader-printer.

DESCRIPTION OF THE PREFERRED EMBODIMENT

Educational institutions rely more and more on methods which will impart information to a large number of people at the least cost in a flexible manner. The storage and use of the vast amount of information which is rapidly accumulating presents economic as well as retrieval and access problems.

The present invention is a simple but unique means of alleviating these difficulties. The invention may be useful to either an individual or a group and may be used in a variety of ways to display and reproduce information contained in the novel film transparency described herein.

The transparencies described may be individual sets mounted on cards, for example, or as detailed below, film strips containing a plurality of image sets.

Figure 1:
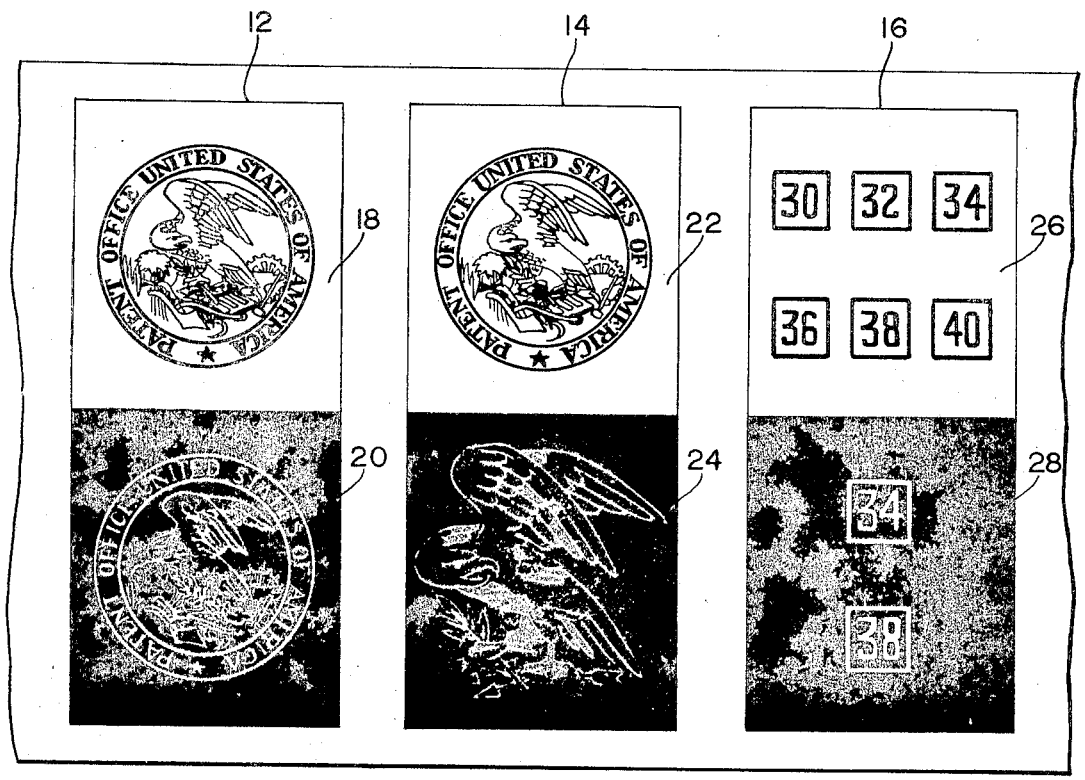
FIG. 1 is a front view of a film strip containing several sets of images used in the practice of the invention.

Referring now to FIG. 1, there is shown a film transparency strip 10 containing image sets 12, 14 and 16. Set 12 consists of images 18 and 20; set 14 of images 22 and 24, and set 16 of images 26 and 28. Although the strip could be arranged to display or reproduce the respective images of more than one set at a time, each set in this embodiment is considered to be displayed or reproduced individually. Examining set 12 it will be noted that image 18 is a positive and image 20 is a negative of the United States Patent Office Seal. Image 18 is displayed to the viewer in apparatus described below and if the viewer so desires, image 20 is printed by manipulation of the apparatus as a hard copy of image 18.

It is not necessary that the photographic composition of both images be in black and white. It is in fact desirable in many cases that image 18 used for direct viewing having a photographic composition in color and image 20 having a photographic composition in black and white, as would be suitable for many of the inexpensive photographic reproductive processes.

For example, set 12 could alternatively comprise a page from an encyclopedia illustrating a subject where color is particularly important to the viewer's interest and appreciation such as a variety of insects and butterflies. At the same time in such a format the various parts of the subjects may be marked with their proper names such as wing, antenna, and the like. The viewer may wish to study and review these names, and after viewing the subject in its natural color, find a black and white copy appropriate for this purpose.

It is apparent that many additional examples of the usefulness of this invention could be given including applications such as medical texts, illustrations of scientific experiments, maps and so forth. What is important is that one image is adapted for viewing and the other for reproduction at the option of the viewer when a reproduction is desired.

Referring to set 14, a positive 22 of the entire scene is shown coupled with a negative 24 of only a portion of the scene, i.e. the eagle of the seal, which is identical in configuration to a portion of image 22. In this particular variation it is desirable to show an entire scene but reproduce only a portion of it on a different scale for in-hand study. An educational course in art, for example, might utilize this approach to display an entire painting to a class in color but to distribute a magnified segment reproduced as hard-copy for individual study of the technique of the artist.

Set 16 further illustrates the flexibility of the invention. Image 26 contains graphs 30, 32, 34, 36, 38 and 40 useful for comparison purposes in a lecture. Graphs 34 and 38 in reproducible image 28 contain information useful for future reference. The configurations of 34 and 38 are identical in each image but optionally their position and size in each image is different allowing the material to be arranged and used in the most convenient manner.

Figure 2:
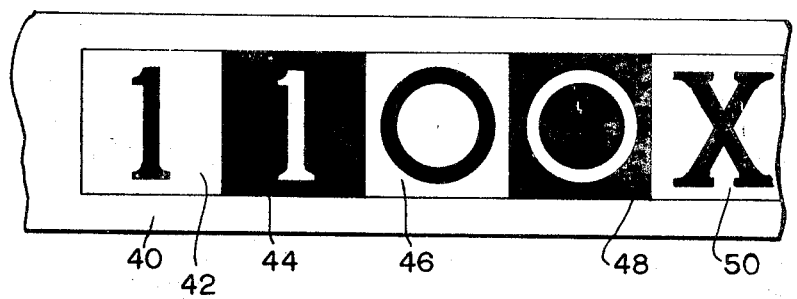
FIG. 2 is an additional view of a film strip with an alternative image arrangement.

FIG. 2 illustrates a film strip 40 having images 42, 44, 46, 48 and 50 arranged side by side. As above, image 42 is adapted for viewing and 44 for reproduction, the pair forming a set. Images 44 and 46 form a similar set. Optionally viewable image 50 may be included in the strip with no associated reproducible image allowing further flexibility.

It will be understood that the invention may be carried out in a number of variations from those shown. The position of each image in a set in relation to its companion on the strip is not important as long as the apparatus employed in using the strip is compatible with the arrangement of the images. Neither should a set be limited to a pair of images. In a set of three, one image may be suitable for viewing and two for reproduction, or the opposite may be true at the option of the user.

Alternately, the frame size of each image in a set may be different to allow for differences in the optical configuration of the viewing and reproducing apparatus.

It is not essential to the practice of all embodiments of the invention that one image be a negative and the other a positive. All that is necessary is that the viewable image be compatible with the projection system and the reproducible image be compatible with the photographic method of reproduction.

A variety of means may be employed to manufacture the strip, all of which are known in the photographic art. For example, a colored original may be prepared by the usual photographic means, a black and white negative contact print prepared from the original and the two either spliced together or a third contact print prepared from the first two. Alternately, both may be imaged onto a third strip in a sequential format as, for example, in FIG. 2.

One reader-printer that may be used with embodiments of this invention is described in the aforesaid patent, incorporated by reference herein as in the form of a console that is built into its own table. An optical projection system is provided that can receive the novel film transparency and project the viewable image onto a screen, or, at the command of the operator, the reproducible image onto photosensitized paper for copying. The photographic reproduction system includes means for holding photosensitive paper that is withdrawn from a supply roll in a projection plane during exposure. Means may also be provided for automatically advancing the exposed portion of the photosensitive paper, while simultaneously bringing unexposed paper into the projection plane, automatically cutting off the exposed portion, and then feeding the exposed paper through a processing unit, removing any excess processing chemicals, and delivering a finished, trimmed print in substantially dry form.

Referring now to the aforesaid patent, the reader-printer is designed to use photosensitive sheet material from a supply roll. The photosensitive material preferably comprises paper that is coated on one surface with a sensitized coating, and that is led from the roll with the sensitive coating disposed downwardly. The paper is engaged by, and can be drawn through an exposure plane, by transport rollers. Exposed paper can be advanced under under a knife and into the transport and processing liquid applicator rolls. An exposed cut sheet is fed from the applicator rolls between guide numbers into a tray of photographic processing liquid, through which it is guided by a vane into the nip of a pair of squeegee rolls from which it is passed upwardly through a chute as a finished, substantially dry print.

Referring now particularly to the optical paths and components shown to view a film transparency strip, such as the film strip shown in FIG. 2 above, the transparency is disposed between the transparent holder plates. Light rays are projected from a lamp through a condenser assembly, through the transparency, and then through a lens system, emerging therefrom in a first optical path about the optical axis A, as shown in the referenced patent.

To use the device for viewing the transparency, the image of the transparency is projected in the path about the optical axis A to a mirror, at the back of the reader-printer cabinet, from which the light rays are then projected along a continuation of the first optical path about an optical axis B, as shown in the referenced patent, onto the viewing screen. The viewing screen may be formed of frosted glass or the like. To use the device for reproducing the adjacent image of the set on the transparency, a mirror is moved from its lower, dotted line position shown in FIG. 2 of the referenced patent to its upper, dashed line position and the film strip is advanced one step to the associated reproducible image either by hand or by suitable integrated mechanical means not shown but which would be obvious to one well skilled in the art. The light rays that are projected from the lens system are then intercepted by the mirror, and are reflected downward in a second optical path about the optical axis C onto a mirror that is mounted in the base of the reader-printer cabinet. The light rays are reflected upwardly from the mirror in a continuation of the second optical path about the optical axis D, through a flat transparent plate of glass or the like, and onto the photosensitive coating of the paper, to expose the photosensitive paper and to form a latent photographic image. The exposed paper is then processed as described above.

Referring to FIG. 3 there is shown apparatus integrated in the reader-printer of the aforesaid patent which may be employed in alternately viewing or reproducing images arranged in sets as in FIG. 1. Film strip 10 containing an upper positive image for viewing and a lower negative image for reproducing is inserted in holder or viewing gate 120 attached to platform 122. The platform and holder may be raised or lowered on slides not shown to bring either of the two images into optical alignment with illuminating means comprising lamp 90 and condenser system 92. For example, screw 124 may be rotatably driven by pulley 126, belt 127, pulley 128 and shaft 130 attached to and propelled by motor 132. It will be understood that many alternative arrangements may be used to align the images and the optical system. Lens 94 can be large enough to encompass both images in its field and a screen placed over one image or the other image to mask the image not in use. Optionally, a variety of arrangements comprising such devices as lever arms, cams or the like may be used to position the respective images in the correct optical path.

Mirror 100 mounted in holder 134 may be oriented simultaneously with the repositioning of the images to alter the optical path for printing or viewing. Reversible low speed motor 136 and simple driving means are shown schematically coupled to motor 132 in control 138. At the command of the user film strip 10 in holder 120 moves up or down in synchronization with mirror 100. Thus, re-orientation of the image positions as well as the redirection of the rays projected from lens 94 may be accomplished in a single step.

The strip in FIG. 1 illustrates images positioned in an end to end relationship. When using a strip of images in a side by side relationship, it is only necessary to advance the strip image by image. However, it may be desirable to mask the optical path between the projection lens and the mirror or screen to prevent the reproducible image from being displayed on the screen or from being swept across the photosensitive sheet by the moving mirror during mode change. Apparatus to accomplish this masking may optionally be included as would be obvious to one well skilled in the art.

It will be appreciated that it is additionally possible to provide sets of images upon an opaque support which are reflex illuminated and which are within the field of view of the projection lens system. This and other designs and modifications will be apparent from the foregoing disclosure.

Accordingly, the present invention is to be construed as limited only by the spirit and scope of the appended claims.

What is claimed is:

1. Apparatus for viewing and reproducing photographic images comprising:
   (a) a film medium containing at least one set of photographic images, each set having first imagery for presenting an image for viewing and second imagery for presenting an image for reproduction, said first imagery being identical in configuration to at least a portion of said second imagery but different in photographic composition from said second imagery to render said first imagery suitable for viewing and said second imagery suitable for reproduction;
   (b) means for viewing the image retained by said first imagery; and
   (c) means for selectively projecting the image retained by said second imagery upon a photosensitive medium for reproduction.

2. The apparatus of claim 1 wherein said film medium is a film transparency.

3. The apparatus of claim 2 wherein said viewing means includes a viewing surface and said viewing means and said means for selectively projecting comprise:
   film transparency illuminating means;
   a lens means disposed to focus light rays from said illuminating means onto said viewing surface to form an image thereon, the path of said rays from said illuminating means to said surface defining a first optical path;
   a dark chamber disposed separately from said viewing surface, said chamber containing said photosensitive medium;
   means movable to intercept said projected light rays to divert them from said surface and into said dark chamber, the path of said rays from said illuminating means to said chamber defining a second optical path; and
   means movable to alternately position said viewable film transparency image in said first optical path and said reproducible film transparency image in said second optical path.

4. The apparatus of claim 3 including means for simultaneously activating said means movable to intercept said projected light rays and said means movable to alternately position said images.

5. The apparatus of claim 3 wherein said images are disposed in vertically arranged sets and wherein said means movable to alternately position said images comprises in combination:
   a frame for holding said images positioned between said illuminating means and said projecting means, said frame slidably mounted to be movable in a substantially vertical plane; and
   motor driven screw means for alternately raising and lowering said frame.

References Cited

UNITED STATES PATENTS

| | | | |
|---|---|---|---|
| 3,019,698 | 2/1962 | Sheldon | 95—18 |
| 3,170,367 | 2/1965 | Wick | 355—44 |
| 3,240,116 | 3/1966 | Stamm | 355—44 |

NORTON ANSHER, Primary Examiner

M. HARRIS, Assistant Examiner

U.S. Cl. X.R.

95—18; 353—36